(12) United States Patent
Shafry et al.

(10) Patent No.: US 6,629,710 B1
(45) Date of Patent: Oct. 7, 2003

(54) INTERLOCKING DEVICE AND ANCHORING SYSTEM

(75) Inventors: Gavriel Shafry, Wermelskirchen (DE);
Bernd Winkelhake, Wolfsburg (DE);
Christian Fenner, Muehlheim (DE);
Juergen Seigel, Schutterwald (DE);
Klaus Schindler, Renchen (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/616,836

(22) Filed: Jul. 14, 2000

(30) Foreign Application Priority Data

Jul. 16, 1999 (DE) .................................... 299 12 439 U

(51) Int. Cl.[7] .............................................. E05C 3/06
(52) U.S. Cl. ................................ 292/216; 292/DIG. 42
(58) Field of Search ........................ 292/216, 201, 292/DIG. 23, DIG. 42, DIG. 43

(56) References Cited

U.S. PATENT DOCUMENTS

| | | | | |
|---|---|---|---|---|
| 4,756,563 A | * | 7/1988 | Garwood et al. | 292/216 |
| 4,880,263 A | * | 11/1989 | Yamada | 292/216 |
| 4,971,379 A | * | 11/1990 | Rumpel et al. | 296/63 |
| 5,232,253 A | * | 8/1993 | Tamiya | 292/201 |
| 5,295,720 A | * | 3/1994 | Budde | 292/201 |
| 5,393,116 A | * | 2/1995 | Bolsworth et al. | 296/65.1 |
| 5,562,322 A | | 10/1996 | Christoffel | |
| 5,577,805 A | | 11/1996 | Glinter et al. | |
| 5,722,727 A | | 3/1998 | Unckrich | |
| 5,868,444 A | * | 2/1999 | Brackmann et al. | 292/201 |
| 5,904,403 A | | 5/1999 | Unckrich | |
| 5,941,579 A | * | 8/1999 | Baniak | 292/216 |
| 6,056,334 A | * | 5/2000 | Petzold et al. | 292/216 |
| 6,152,500 A | * | 11/2000 | Kowalewski et al. | 292/216 |
| 6,152,515 A | * | 11/2000 | Wieclawski | 296/65.03 |
| 6,196,610 B1 | * | 3/2001 | Pesta et al. | 296/65.03 |

FOREIGN PATENT DOCUMENTS

| | | |
|---|---|---|
| EP | 0776781 | 6/1997 |
| GB | 2212208 | 7/1989 |
| GB | 2231617 | 11/1990 |
| WO | WO 9902365 | 1/1999 |

* cited by examiner

*Primary Examiner*—Brian L. Johnson
*Assistant Examiner*—Bryan Fischmann
(74) *Attorney, Agent, or Firm*—Foley & Lardner

(57) ABSTRACT

The present invention generally relates to an interlocking device and in more particular to an interlocking device with a rotary latch that receives a latching bolt. In operation, the rotary latch can swing out of a release position into a locked position, by means of the bolt engaging a coupling jaw of the rotary latch. When the rotary latch is in a locked position, a safety element in an arresting position prevents rotary latch from swinging into its release position.

15 Claims, 3 Drawing Sheets

INTERLOCKING DEVICE AND ANCHORING SYSTEM

PRIORITY

This application claims priority to German Application No. 29912439.8, filed on Jul. 16, 1999.

TECHNICAL FIELD OF INVENTION

The present invention relates to an interlocking device with a rotary latch and with a latching bolt within the rotary latch. The rotary latch can swing out of a release position into a locked position for locking, by means of a bolt engaging a coupling jaw of the rotary latch. When the rotary latch adopts its locked position, safety element moves from a non-arresting position into an arresting position in which it prevents the rotary latch from swinging back to the released position.

The invention also relates to an anchoring system for mutual anchoring of a first part and a second part, wherein the first part moves relative to the second part, and which features an interlocking device of the present inventor.

BACKGROUND OF THE INVENTION

Particular fields of application for the invention are seat anchorages for removable and winding car seats, anchorage of ejection seats, door and flap locks, mobile passenger compartment systems, connecting ships together, or anchoring containers.

An interlocking device of this type is previously known and is described DE4324691A1. This device, which features a catch bolt fastened on one element and a rotary latch, that is pivotally mounted on the other element. The rotary latch engages the catch bolt with a coupling jaw, and a ratchet that tightly locks into the rotary latch. The catch bolt is located on the one hand within a three-point bearing, whose one point is formed by the edge of the rotary latch's coupling jaw and on the other hand, the ratchet's pivot mounting is designed so that a limited displacement of the ratchet at the end of its fall into the rotary latch will generate a force on the rotary latch that presses the edge of its coupling jaw onto the catch bolt. This device as described in the above patent, is useful for locking two elements that swing relative to each other into a predefined relative position. In particular, for locking the folding seat backs on the seating portion of a seat, where the interlocking device achieves a total zero backlash in its locked position independently of tolerance limits.

However, one of the major drawbacks of the above device is, there are inadequate safety controls when the device is not operated properly. In this connection, improper operation is understood either as a so-called illusory interlock or an unintentional interlock. An illusory interlock is an unsafe interlock, in which there is a great danger when the user assumes the system to be locked when the same is not. When such an interlocking device is used to anchor one foot of a seat with a floor of an automobile, it is possible that the user will start driving with an incompletely locked seat. For example, in a crash, where the occupant is not held by the seat, could result in fatal consequences. Unintentional interlock can occur from improper handling, so that manual release of the seat anchorage can be necessary to insert the seat, causing user aggravation.

SUMMARY OF THE INVENTION

It is the objective of the invention to manufacture, with little structural expense, an interlocking device and an anchorage system, which is distinguished by its increased safety features against improper operation.

According to the present invention, a control element which is designed and arranged relative to the rotary latch and the safety element in such a way, that the control element detects the presence of a bolt in the coupling jaw, whereby the inter-cooperation of the rotary latch, safety element, and control element forces the rotary latch into its release position when the bolt is not in the coupling jaw.

In the preferred embodiment, the interlocking device is designed monostable for the rotary latch's release position. Monostable design is understood as a system or an element of the system where it can assume only one stable state, even when external forces are applied. In contrast, there are bistable or unstable system designs, wherein a system or an element of the system can assume two stable states when external forces are applied. A system or an element of a system is unstable when it can assume several non-stable states. Because of the monostable design of the rotary latch's release position, the interlocking device an only adopt the locked state when the latching bolt has engaged the rotary latch. The system integrates the catch bolt in a such a way that the locking function is only possible with the aid of this element. Even an intentionally caused manipulation, in the form of first inserting a part similar to the bolt into the rotary latch's coupling jaw in the conventional manner, thereby causing interlocking, and then removing the part again laterally, i.e. perpendicular to the original direction of insertion or perpendicular to a plane that the coupling jaw's opening extends across, will cause the interlocking device according to invention to automatically release again after the part has been removed. A part to be locked by means of the interlocking device according to invention, such as a removable car seat, can thereupon be properly anchored on a car's floor structure without additional manual effort by the user to release the interlocking device.

The interlocking device according to invention is distinguished by the additional advantage, that it can be released in two different ways. Release can be performed both by removing the safety element from its arresting position for the rotary latch and also by lateral removal of the bolt from the rotary latch, as described above.

The control element can thereby additionally be designed in preferred advantageous embodiments and be arranged in relation to both the rotary latch and the safety element so that it releases or automatically causes the safety element to move into its arresting position when the bolt is inserted into the coupling jaw. The control element triggers or automatically causes the safety element to move into its non-arresting position and the rotary latch to move into its release position when the bolt is removed from the coupling jaw, and prevents the safety element from moving into its arresting position when the bolt isn't in the coupling jaw.

Such an interlocking device according to invention is provided for the anchoring system according to invention, wherein the rotary latch, the safety element, and the control element are attached swivel-mounted with the first part, by means of a casing in particular, and the bolt is tightly connected with the second part.

In this connection, the foot of a seat can constitute the first part and an automobile's floor can constitute the second part, or vice versa.

BRIEF DESCRIPTION OF THE DRAWINGS

Further features and advantages of the invention will become apparent from the following discussion and accompanying drawings in which.

DETAILED DESCRIPTION OF THE PREFERRED EMBODIMENT

Figure 1:
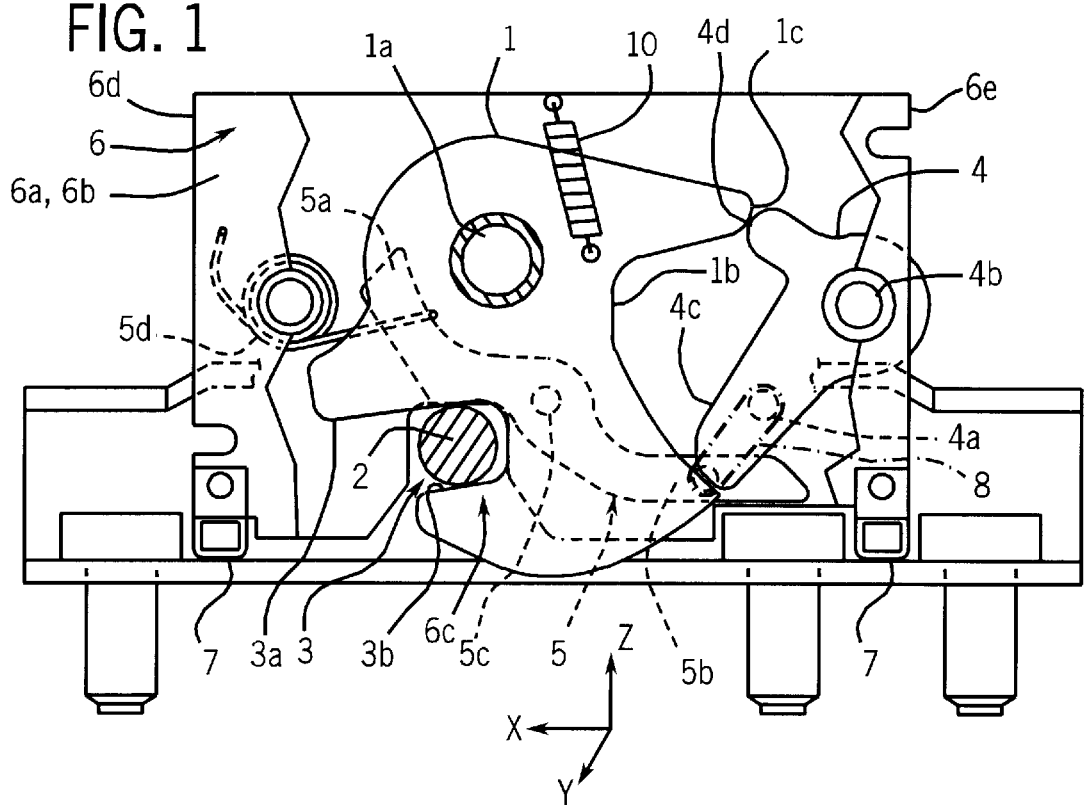
FIG. 1 is a front view of the interlocking device in a locked position, in accordance with the teachings of the present invention.

The same parts are always provided with the same reference symbols in the various figures of the drawing and will therefore each only be described once as a rule.

Figure 3:
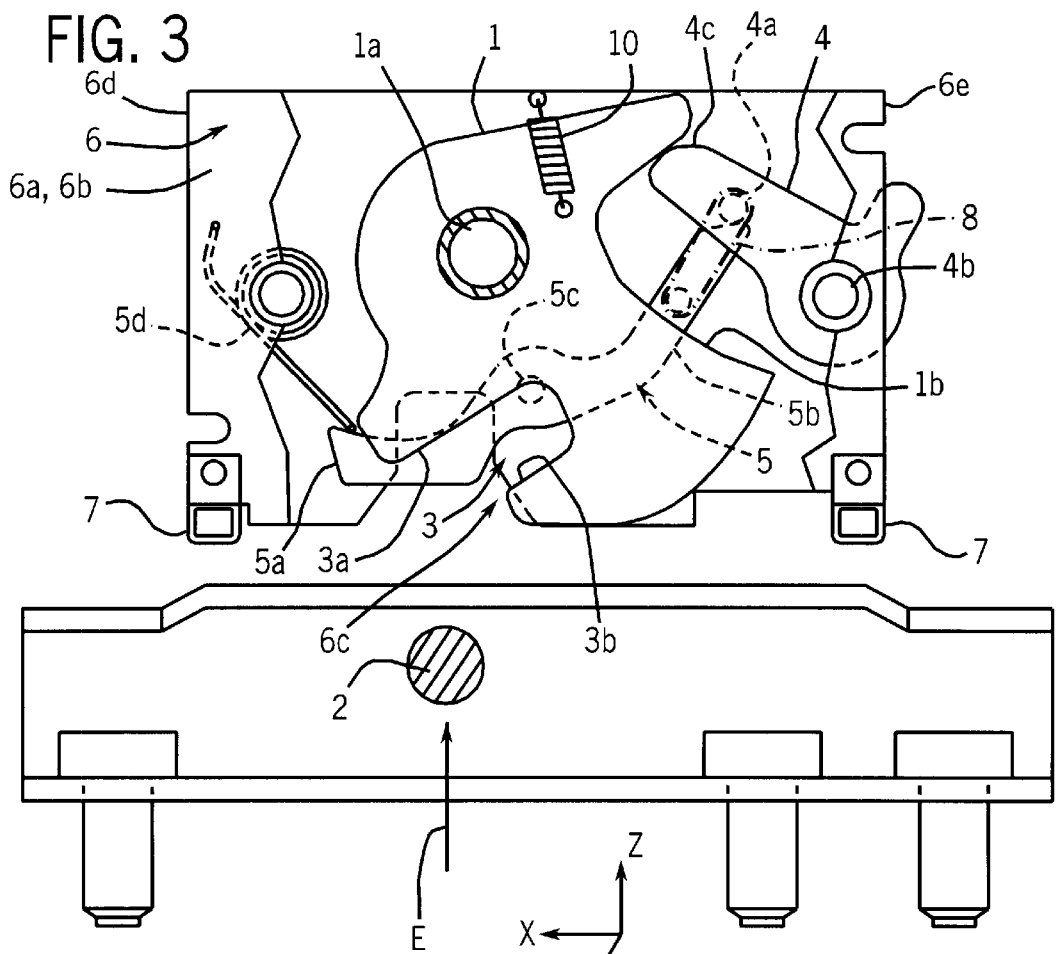
FIG. 3 is a front view of the interlocking device in a released position, in accordance with the teachings of the present invention.

Referring in particular to FIGS. 1 and 3, an interlocking device according to invention features a rotary latch 1 and a latching bolt 2 in the rotary latch. The rotary latch 1 swings out of a release position FIG. 3 into an interlocking position FIG. 1 for locking, by means of the bolt 2, which engages a coupling jaw 3 of the rotary latch 1. The interlocking device additionally features a safety element 4 which, when rotary latch 1 has assumed the locked position, moves from a non-arresting position FIG. 3 into an arresting position FIG. 1, in which it prevents the rotary latch 1 from swinging into its release position. The release position of rotary latch 1 is in a monostable position, i.e. rotary latch 1 can only assume one stable state, i.e., a released state, even if external forces are applied.

A control element 5 is also provided, which is designed and arranged relative to the rotary latch 1 and the safety element 4 in such a way, that the control element 5 detects the presence of the bolt 2 in the coupling jaw 3. When the bolt 2 is not located within the coupling jaw 3, the rotary latch 1, safety element 4, and control element 5 cooperate in such a way that they always force rotary latch 1 into its release position. Control element 5 is designed as a lever with two arms 5a, 5b. When the rotary latch 1 is in the release position, lever arm 5a of the control element 5 may cover the coupling jaw of the rotary latch. At the same time, the lever can be subjected in particular to the effect of a spring 5d which, both in the release position and in the locked position of the interlocking device, exerts a force on control element 5 that operates around a bearing axis 5c of the lever and is counterclockwise. In the alternate, the control element 5 can be designed as a spring.

When bolt 2 is not located within the coupling jaw 3, the other lever arm 5b of control element 5 abuts a driver 4a of safety element 4 and thus prevents the movement of the safety element 4 into its arrested position as shown in FIG. 3. The safety element 4 on the other hand holds the rotary latch 1 in its release position. It would also be possible for rotary latch 1 to be held in its release position by a spring 10, which, in the illustrated drawing, applies its force around a bearing axis 1a in a counterclockwise direction. The bolt 2 presses the lever arm 5a of control element 5, which covers coupling jaw 3 of rotary latch 1 when rotary latch 1 is in the release position, out of the region of coupling jaw 3 (in the drawing, upwards) opposite the effect of the aforementioned spring, when bolt 2 is inserted into coupling jaw 3 (direction of the arrow E in FIG. 2). The other lever arm 5b thereby moves away (clockwise) from the driver 4a of safety element 4. When bolt 2 is inserted into coupling jaw 3, the control element 5 thus releases safety element 4 to move into its arresting position. Safety element 4 can now move into its arresting position under the effect of a spring for example, that acts upon safety element 4 in the counterclockwise direction around its bearing axis 4b.

Figure 2:
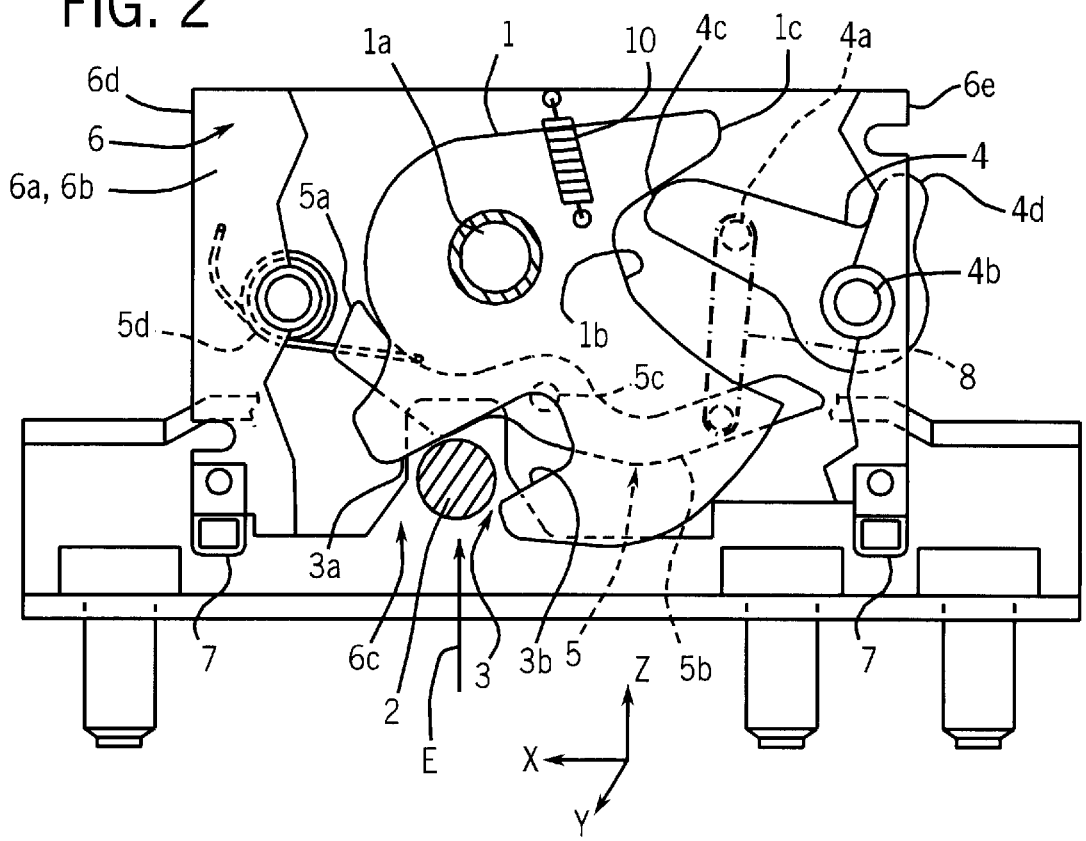
FIG. 2 is a front view of the interlocking device in an intermediate position, in accordance with the teachings of the present invention.

The control element 5 and safety element 4 can also be kinematically coupled to each other in such a way that the control element 5 not only releases the movement of safety element 4 when bolt 2 is inserted into coupling jaw 3, but also moves the safety element 4 into an arresting position, as is done by the spring 8, which is illustrated in FIGS. 1–3 but not indicated in detail and which encircles driver 4a of safety element 4 and a corresponding driver on control element 5.

In the illustrated embodiments, the rotary latch 1 and the safety element 4 are each adjacent to each other and both feature a rolling contour 1b, 4c for each other. In the preferred embodiment, at least one of the two parts should preferably feature a rolling contour for the other part.

For the sequence of motion to start as smoothly as possible, it is preferable at the same time, for the rolling contours 1b, 4c to feature a non-inclined starting piece in a region (not indicated in detail) in which the rotary latch 1 and safety element 4 abut each other when safety element 4 starts to move out of its non-arresting position into its arresting position.

For stable adoption of the arresting position, it can likewise be advantageous for the respective rolling contour 1b, 4c to feature a self-locking region (also not indicated in detail) for the rolling movement, i.e. a curvilinear guide, each inclined toward the other element, within an area in which the rotary latch 1 and the safety element 4 abut each other at the end of the movement of safety element 4 from its non-arresting position into its arresting position. Reciprocal stop faces 1c, 4d, which are also independent of the respective rolling contour 1b, 4c and which each prevent farther movement in the direction "release position to interlocking position" or "non-arresting position to arresting position" of rotating latch 1 and safety element 4 respectively, when rotating latch 1 assumes the interlocking position, can also be provided as illustrated in FIG. 1.

In the preferred embodiment of the invention, coupling jaw 3 of rotating latch 1 can also feature a sliding contour for a peripheral surface of the bolt 2 on at least one edge, preferably on both edges 3a, 3b which abuts/abut bolt 2 when locking. An optimal guide for bolt 2 can be adapted within coupling jaw 3 in this manner.

In the preferred embodiment of the invention, the rotating latch 1, safety element 4, and control element 5 can each be pivotally mounted in two opposite side walls 6a, 6b of a casing 6, as shown in the drawing. The advantage of such an embodiment lies in the fact that all these components 1, 4, 5, 6 are integrated into a compact, easily handled and easily mounted modular unit.

The side walls 6a, 6b of casing 6 can preferably each feature a cutout 6c, which is fitted at least in its size, but also in shape, to the cross section of bolt 2, and which bounds the position of bolt 2 within casing 6 on three sides of the perimeter in accordance with a clearance space. Bolt 2 can be safely and stably arrested in this manner, because an edge 3b of coupling jaw 3 will then close the fourth side of the perimeter when the device is in its interlocked position as shown in FIG. 1. As shown in FIGS. 1 to 3, each of these cutouts 6c proceeds from the lower flange (not shown in detail) of the side walls 6a, 6b of the casing 6. At the respective lower flange, its width is approximately twice the diameter of the bolt and it then diminishes to approximately the dimension of the diameter of bolt 2 plus the deviation that arises from the permissible tolerances and play. During the manufacture of the bolting device, bolt 2 will simply turn up in the cutout 6c and will be centered there.

The sliding contour of coupling jaw 3 can now be preferably coordinated with the rolling contours 1b, 4c for the mutual rolling movement of rotary latch 1 and safety element 4 on at least one edge, preferably on both edges 3a, 3b, in such a manner that, when bolt 2 is present in the coupling jaw 3, the movement of rotary latch 1 and safety element 4 in cooperation with the cutout 6c of casing 6 will cause self-adjusting compensation for tolerances and play of the position of bolt 2. The self-adjusting compensation for play will occur in two directions in space, which are labeled by the coordinates X and Z in FIGS. 1 to 3. If play should still be present in the X direction immediately after bolt 2 has been inserted, then the play will continue to be reduced by a small relative movement until play is no longer present when rotary latch 1 is in the interlocked position. In the third direction (Y direction), which corresponds to the alignment of the longitudinal axis of bolt 2, bolt 2 can be held non-positively, possibly cushioned by rubber elements. The transition of rotary latch 1 out of its interlocking position into its release position is triggered on the one hand by a movement of safety element 4 out of its arresting position into its non-arrested position with the aid of a suitable operating mechanism, such as a lever or Bowden cable, but is also triggered by removing bolt 2 perpendicularly to a plane over which coupling jaw 3 extends (axial direction of bolt 2, Y direction).

When bolt 2 is removed from the coupling jaw, the control element 5 can either trigger a movement of safety element 4 into its non-arresting position and a movement of the rotary latch 1 into its release position, or also be kinematically coupled with these components in such a way, that it moves safety element 4 into its non-arresting position and rotary latch 1 directly or indirectly into its release position when bolt 2 is removed from coupling jaw 2.

An anchoring system according to invention is distinguished by the integration of an interlocking device according to invention, wherein the rotary latch 1, the safety element 4, and control element 5 are pivot mounted with a first part, especially by means of casing 6, and bolt 2 is tightly connected with a second part. In this connection, the first part moves relative to the second part.

As previously mentioned, the foot of a seat can constitute the first part, which moves relative to the second part, especially a removable and winding car seat, and the floor of the vehicle, an automobile in particular, can constitute the second part. The entire system of fastening a fixing point (foot) of the car seat to a vehicle structure, including all parts belonging to the vehicle structure, is called an anchorage, whereas the lower part of the vehicle structure, which connects the side panels of the vehicle structure, is understood to be the floor. A seat is a structure that includes upholstery and a covering, which provides a seating place for an adult. In this connection, the concept is interpreted so that it includes both a single seat as well as the portion of a bench that corresponds to a seating place for one person. In this case, the interlocking device according to invention is an element of the anchorage and holds the seat in the service position. It produces the actual attachment to the automotive body and is divided here into a seat locking element, which is constituted by rotary latch 1, and a floor locking element, which is constituted by the bolt 2. The safety element 4 likewise represents an element of the anchoring system as a device opposing unintentional release of anchorage's opening by the user. Control element 5 is useful as an element of the anchoring system according to invention for automatic opening/closing of the safety bolt and/or the interlocking device while the interlocking device is being locked and unlocked. The anchoring system can also be installed in the reverse manner, i.e. the rotary latch 1 can be conceived as a floor locking element on the vehicle while the bolt 2 is a seat locking element. In the anchoring system according to invention, the coordinate X preferably corresponds to the vehicle's direction of the travel or the direction of the vehicle's longitudinal axis, the coordinate Y to the direction of the vehicle's lateral axis, and the coordinate Z to the vertical. The anchoring system with improved safety according to invention thus represents an inexpensive alternative to known seat anchoring systems for example, in which neither an illusory interlock nor a faulty interlock can occur.

Figure 4:
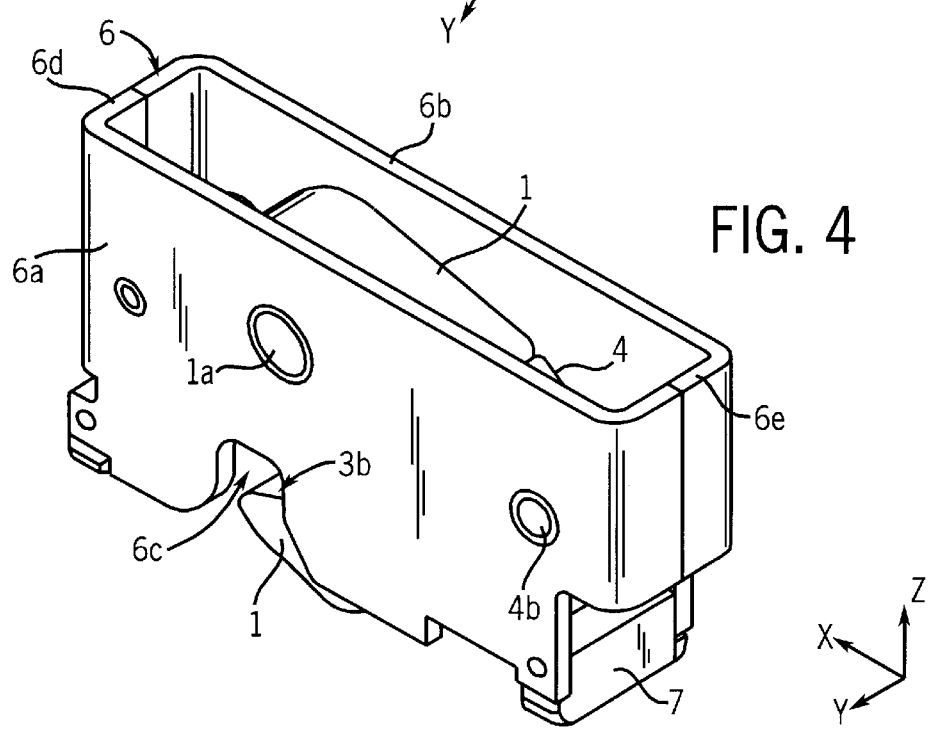
FIG. 4 is a perspective view of the interlocking device in a casing.
Figure 5:
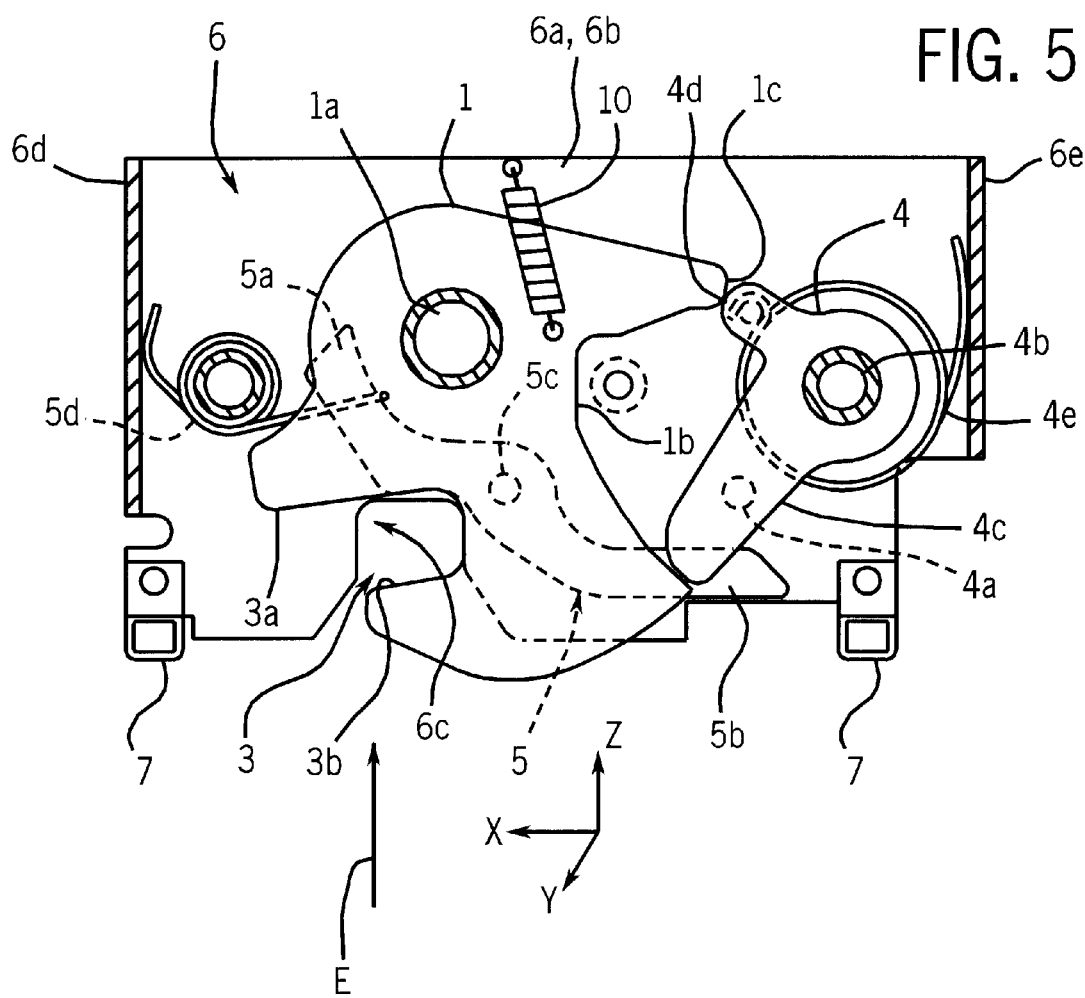
FIG. 5 is a front view of the interlocking device under the load of springs, in a locked position, in accordance with the teachings of the present invention.
Figure 6:
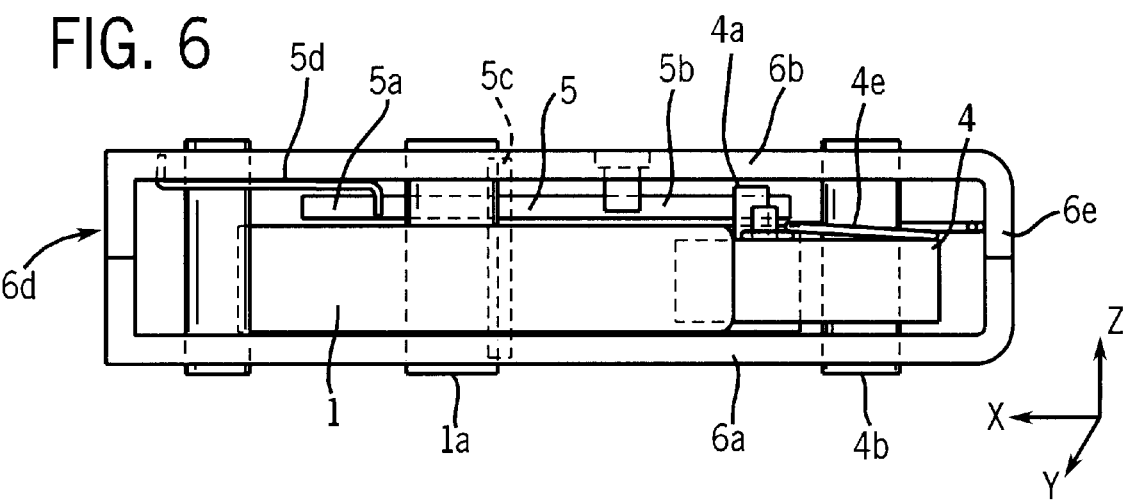
FIG. 6 is a plan view of the interlocking device under the load of spring, in a locked position, in accordance with the teachings of the present invention.

FIGS. 4 to 6 further illustrate the interlocking device according to present invention. The control element 5 is installed in casing 6 adjacent to the safety element.

Further, the safety element 4 and the control element 5 are each under the load of a spring, shown as torsion springs 4e, 5d. A leg of the spring 5d for control element 5 supports itself on an end wall 6d of casing 6, the other leg loads the first lever arm 5a of the control element 5 with a clockwise force as shown in FIG. 5. A leg of spring 4e for the safety element 4 supports itself on the end wall 6e of casing 6, which is opposite the end wall 6d upon which spring 5d for control element 5 supports itself. The other leg of this spring 4e loads the safety element 4 with a counterclockwise force. The spring 5d for control element 5 and the spring 4e for the safety element 4 behave antagonistically toward each other. The spring 5d for control element 5 desires to move the safety element 4 into its non-arresting position (caused by the two lever arms 5a, 5b of control element 5), while spring 4e of safety element 4 swings the safety element 4 into its arresting position. Spring 5d for the control element 5 has a greater resultant effect on the safety element 4 (taking lever arms 5a, 5b into consideration) than spring 4e so that rotary latch 1 will monostably assume the release position when bolt 2 isn't present within coupling jaw 3. When bolt 2 is removed in its longitudinal direction, the second lever arm 5b of control element 5 abuts the driver 4a of safety element 4 and, under the effect of spring 5d of control element 5, moves the safety element 4 into its unlocked position against the effect of spring 4e of the safety element 4, whereby rotary latch 1 arrives at or can arrive at its release position. In this connection, the swivel movement of rotary latch 1 can likewise occur with support from springs.

It must be understood that various variations of the present invention are possible. For example, in the first embodiment of the invention described above only needs control element 5, but rotary latch 1, safety element 4 and/or control element 5 can each be under the load of a spring, whereby different spring combinations regarding spring resistance and direction of action are possible. As described, the bearing axes, 1a, 4b, 5c of rotary latch 1, the safety element 4, and the control element 5 can be implemented in different ways, such as pin suspensions or even as sleeve bearings.

The device can feature additional suitable details, like the sliding feet labeled with a 7 in the drawing. When bolt 2 is tightly mounted, even the entire casing 7, together with the components mounted within it, can be shifted laterally (in the Y direction) on these sliding feet to lift the interlocking of bolt 2. The bolt 2 does not have to feature a circular cross section as illustrated, but could also have a polygonal cross section for example.

The foregoing discussion discloses and describes a preferred embodiment of the invention. One skilled in the art will readily recognize from such discussion, and from accompanying drawings and claims, that changes and modifications can be made to the invention without departing from the true spirit and fair scope of the invention as defined in the following claims.

What is claimed is:

1. An interlocking device comprising:

a rotary latch having a coupling jaw;

a latching bolt received within said rotary latch, wherein said rotary latch can swing out of a release position into a locked position for locking, by way of said bolt engaging said coupling jaw of said rotary latch;

a safety element, wherein when said rotary latch is in the locked position, said safety element in an arresting position prevents said rotary latch from swinging into the released position; and a control element arranged relative to said rotary latch and said safety element, wherein said control element detects a presence of said bolt in said coupling jaw and releases said safety element to move into said arresting position when said bolt is inserted into said coupling jaw and wherein said control element triggers a movementof said safety element into said non-arresting position and a movement of said rotary latch into said release position when said bolt is removed from said coupling jaw.

2. The interlocking device of claim 1, wherein a transition of said rotary latch out of an interlocking position into said release position is triggered by a movement of said safety element out of its arresting position into its non-arrested position or by removing said bolt perpendicularly to a plane over which said coupling jaw extends.

3. The interlocking device of claim 1, wherein said control element moves said safety element into said arresting position when said bolt is inserted into said coupling jaw.

4. The interlocking device of claim 1, wherein said control element moves said safety element into its non-arresting position and said rotary latch into said release position when said bolt is removed from said coupling jaw.

5. The interlocking device of claim 1, wherein said control element prevents said safety element from moving into its arresting position when said bolt is not in said coupling jaw.

6. The interlocking device of claim 1, wherein at least one of said rotary latch, said safety element and said control element are under a load of a spring.

7. The interlocking device of claim 1, wherein said rotary latch is held in the release position by said safety element.

8. The interlocking device of claim 1, wherein said rotary latch and said safety element abut each other in a region on their face and at least one of said rotary latch and safety element features a rolling contour.

9. The interlocking device of claim 1, wherein said coupling jaw of said rotary latch features a sliding contour for a peripheral surface of said bolt on at least one edge, which abuts the bolt when locking.

10. The interlocking device of claim 1, wherein said control element is designed as a two-armed lever.

11. An interlocking device comprising:

a rotary latch having a coupling jaw, said rotary latch biased toward a release position by a spring;

a latching bolt received within said rotary latch, wherein said rotary latch can swing out of the release position into a locked position for locking, by way of said bolt engaging said coupling jaw of said rotary latch;

a safety element, wherein when said rotary latch is in the locked position, said safety element in an arresting position prevents said rotary latch from swinging into the released position; and a control element arranged relative to said rotary latch and said safety element, wherein said control element detects a presence of said bolt in said coupling jaw and releases said safety element to move into said arresting position when said bolt is inserted into said coupling jaw.

12. An interlocking device comprising:

a rotary latch having a coupling jaw;

a latching bolt received within said rotary latch, wherein said rotary latch can swing out of a release position into a locked position for locking, by way of said bolt engaging said coupling jaw of said rotary latch;

a safety element, wherein when said rotary latch is in the locked position, said safety element in an arresting position prevents said rotary latch from swinging into a released position; and a control element arranged relative to said rotary latch and said safety element wherein said control element detects a presence of said bolt in said coupling jaw, whereby the inter-cooperation of said rotary latch, safety element, and control element forces said rotary latch into said release position when said bolt is not in said coupling jaw, wherein said control element is designed as a two-armed lever, and wherein when said rotary latch is in the release position, one lever arm of said control element covers said coupling jaw of said rotary latch under the effect of a spring.

13. The interlocking device of claim 12, wherein when said rotary latch is in the release position, said lever arm of said control element blocks entry to said coupling jaw of said rotary latch and when said bolt is inserted into said coupling jaw, said bolt presses said lever arm out of the region of said coupling jaw opposite the effect of at least one spring.

14. An interlocking device comprising:

a rotary latch having a coupling jaw;

a latching bolt received within said rotary latch, wherein said rotary latch can swing out of a release position into a locked position for locking, by way of said bolt engaging said coupling jaw of said rotary latch;

a safety element, wherein when said rotary latch is in the locked position, said safety element in an arresting position prevents said rotary latch from swinging into the released position; and a control element arranged relative to said rotary latch and said safety element, wherein said control element detects a presence of said bolt in said coupling jaw and releases said safety element to move into said arresting position when said bolt is inserted into said coupling jaw;

wherein said rotary latch, safety element, and control element are pivotally mounted in two opposite side walls of a casing.

15. The interlocking device of claim 14, wherein said side walls of said casing each feature a cutout, which is fitted at least in size to the cross section of said bolt, and which bounds the contour of said bolt within said casing on three sides of the perimeter when the bolt is within the cutout.

* * * * *